United States Patent [19]
Yanagisawa et al.

[11] Patent Number: 5,805,412
[45] Date of Patent: Sep. 8, 1998

[54] MULTIPLE STACKED DOCKING STATIONS AND PORTABLE COMPUTER

[75] Inventors: Takashi Yanagisawa, Yokohama; Kazuhiko Maeda, Sagamihara; Taketoshi Yokemura, Yamato, all of Japan

[73] Assignee: International Business Machines Corporation, Armonk, N.Y.

[21] Appl. No.: 741,586

[22] Filed: Oct. 31, 1996

[30] Foreign Application Priority Data

Feb. 20, 1996 [JP] Japan ................................. 8-031699

[51] Int. Cl.⁶ .............................. G06F 1/16; H05K 7/10
[52] U.S. Cl. .......................................... 361/686; 395/280
[58] Field of Search .................................. 395/280, 281; 361/683–686, 725–727

[56] References Cited

U.S. PATENT DOCUMENTS

| | | | |
|---|---|---|---|
| 5,123,092 | 6/1992 | Buxton et al. | 395/250 |
| 5,396,400 | 3/1995 | Register et al. | 361/686 |
| 5,434,743 | 7/1995 | Hosoya et al. | 361/686 |
| 5,436,792 | 7/1995 | Leman et al. | 361/686 |
| 5,457,785 | 10/1995 | Kikinis et al. | 395/308 |
| 5,459,637 | 10/1995 | Ma et al. | 361/686 |
| 5,463,742 | 10/1995 | Kobayashi | 395/281 |
| 5,491,609 | 2/1996 | Dankman et al. | 361/686 |
| 5,493,542 | 2/1996 | Odelid | 364/708.1 |
| 5,526,493 | 6/1996 | Shu | 395/281 |
| 5,535,093 | 7/1996 | Noguchi et al. | 361/686 |
| 5,579,528 | 11/1996 | Register | 395/200.12 |
| 5,598,537 | 1/1997 | Swanstrom et al. | 395/281 |
| 5,598,539 | 1/1997 | Gephardt et al. | 395/281 |
| 5,619,659 | 4/1997 | Kikinis et al. | 395/281 |
| 5,627,728 | 5/1997 | Ma et al. | 361/686 |

*Primary Examiner*—Ayaz R. Sheikh
*Assistant Examiner*—Xuan M. Thai
*Attorney, Agent, or Firm*—Daniel E. McConnell; Bernard D. Bogdon

[57] ABSTRACT

A docking station adapted to a portable computer has a first docking unit, which can be mechanically coupled with the portable computer, including a first connector for electrically connecting with the portable computer, more than one connection port provided for the respective port signal lines that run from the first connector, and a second connector for directly passing through bus signal lines that run from the first connector; and a second docking unit, which can be mechanically coupled with the first docking unit, including a third connector for electrically connecting with the second connector, space for retaining a peripheral device connected to a bus expanded through the third connector, and at least one bus slot to connect an expansion adaptor card to the bus expanded through the third connector. The assemblage of the first and the second docking units with the portable computer comprise a docking station complex of vertically stacked units which are mechanically coupled and electrically connected to provide a substantially unitary structure. The electrical connectors between the units are arranged to mechanically connect in opposite horizontal directions to mechanically bind the docked units and to provide the unitary structure to the docking station complex.

11 Claims, 12 Drawing Sheets

MULTIPLE STACKED DOCKING STATIONS AND PORTABLE COMPUTER

BACKGROUND OF THE INVENTION

The present invention relates to a docking station for a portable computer that is mechanically coupled with and electrically connected to a portable computer to expand the peripheral environment of the portable computer. More particularly, the present invention pertains to a docking unit, for a portable computer, that can be constituted with selected functions required by a user.

As a consequence of recent developments in technology, various types of personal computers, such as desktop and notebook types, have been produced and are available on the market. Of these, notebook computers are battery-operable personal computers for which portability is a design consideration.

Since compact size and light weight are important notebook computer features, expansion of these computers by adding internal peripheral devices is not always possible as there is little extra space available, and device expansion merely using a PC Card does not always provide a viable alternative. Furthermore, exterior dimensions of a notebook computer constitute just a small surface area, only a very limited number of bus slots can be provided. Accordingly, while it is not too uncommon for desktop and similar computers to have ten or more bus slots, laptop and notebook computers ordinarily are provided with no bus slots, or one or two at the most. Also, as portability is the most important feature for a notebook computer, having to attach or detach cables (e.g., printer cables, monitor cables, communication cables) each time a notebook computer is used, whether in or outside an office, is a very troublesome task that adversely affects the usability of the unit.

The employment of a so-called "docking station" (also called an "expansion box" or an "expansion unit"), when a notebook computer is used in an office, makes it possible to provide a notebook computer with the same working environment as that of a desktop computer, while at the same time not adversely affecting portability. The primary functions of a docking station are "port replication" and "bus expansion". Port replication is realized by providing a docking station with connection ports for notebook computer expansion. In other words, when a cable has been connected to each port of a docking station in advance, a user need only dock a notebook computer in the docking station to immediately secure the use of a printer, an external monitor, a network, etc. From the point of view that all cable connections are managed by it, the port replication function is also called a "cable management" function. On the other hand, the bus expansion function is realized by a docking station possessing the capability to expand the bus in a notebook computer, and having at least one bus slot. By docking a notebook computer in a docking station, it is possible for a user to employ desired adaptor cards and devices via the docking station. In other words, no special limitations related to space are placed on the user of a notebook computer.

A docking station is disclosed in, for example, the specifications of Japanese Patent Application No. Hei 05-181593, and Japanese Patent Application No. Hei 06-134124, both of which are assigned to the present applicant.

In FIG. 16 are shown a typical notebook computer 100 and docking station 200. At the rear, the notebook computer 100 has a connector for use when docking (hereinafter referred to as a "docking connector"; not shown). The docking connector generally consists of several tens to several hundreds of connector pins, with each connector pin being assigned for a port signal line or a bus signal line in the notebook computer 100. The bus that the notebook computer 100 allocates for the docking connector (i.e., the bus for which expansion is desired) is normally an ISA (Industry Standard Architecture) bus, which is a standard input/output bus. This is because the ISA bus has long been the de facto standard in this field, and also because there is a legacy inherited by PC/AT compatible machines, in the form of numerous ISA devices and ISA applications. In addition, among some of the latest notebook computers, instead of an ISA bus, a PCI (Peripheral Component Interconnect) bus, positioned as a local bus of the CPU, is assigned to a docking connector. In other words, the PCI bus is expanded. This seems to have occurred for the following reasons: the number of devices, such as graphics and PC cards, that require high speed data transfer has increased; the number of devices connectable to a single PCI bus is limited so expansion of the PCI bus is required; and each bus can be stably expanded electrically by means of a PCI bridge circuit.

The docking station 200 comprises a main body that incorporates electric circuitry; a mounting portion at which the notebook computer 100 is mounted on the top surface of the main body; and a projection portion that projects upward from the rear end of the mounting portion. A connector is provided on the front surface of the projection portion to engage a docking connector provided on the rear surface of the notebook computer 100. The surface of the connector may be covered with a freely openable lid in order to protect the connector when it is not used. A pair of linear protrusions are also formed along both sides of the mounting portion for guiding the computer when it is being mounted.

The forms of docking stations vary, and range from relatively small ones that have only a port replication function, to relatively large ones that can afford to provide a plurality of storage spaces (also called "media bays") in which fixed or detachable memory devices (HDDS, FDDs, CD-ROM drives, etc.) can be accommodated, and that can provide at least one bus slot for inserting adaptor cards. However, all the different types of docking stations have essentially the following shortcomings.

(1) Product lineups for the docking stations must, in respect to their capabilities and the number of devices that can be expanded, correspond to the number of docking connector types (N) and the number of configuration types (M). Therefore, a manufacturer must develop and produce N×M types of products and must also carry these types as inventory. Since configurations also differ, depending on whether a expanded bus is a PCI bus or an ISA bus, the number of product types is accordingly increased.

(2) A user selects and purchases a docking station having a desired configuration from among those with electrical and mechanical specifications that match the specifications for the docking connector on his notebook computer. As time passes and if the user needs to increase the expansion capabilities of a bus or to alter the configuration, the user must purchase another docking station. Furthermore, a notebook computer that expands an ISA bus can not be operated with a docking station for a PCI bus. Conversely, a notebook computer that expands a PCI bus can not be operated with a docking station for an ISA bus. A connector and its peripheral portion configured for mechanical and electrical coupling with a notebook computer, substantially conform to product specifications, such as the form factor for the notebook computer, and may not be interchangeably applied. Thus, it could happen that when a new notebook computer is purchased, a docking station must be changed accordingly.

A moderate solution for the problem can be conceived of whereby the bus expansion function of a docking station is augmented in anticipation of an eventual up-grading of a system configuration, that is, by providing an extra bus slot and a media bay. However, when a function that will be employed by only a limited number of persons under specific conditions is provided as a standard feature of a product, greater expense is put on users.

Typically, in an office (or a workshop) a plurality of users (multi-users) who use a docking station alternately connect their respective notebook computers to it. Within the same office, however, the notebook computers employed by users will represent a variety of types, such as PCI bus expansion types and ISA bus expansion types. Thus, if the expanded bus type of the docking station is fixed, it is difficult to realize a multi-user environment.

The port replication functions among docking stations have more commonality with each other than the bus expansion functions do. Therefore, it is very wasteful to exchange an entire docking station only because the configuration of the bus expansion function does not match the perceived need.

SUMMARY OF THE INVENTION

It is one purpose of the present invention to provide a superior docking station, for a portable computer, that is mechanically coupled with and is electrically connected to a portable computer to expand the functions of the portable computer.

It is another purpose of the present invention to provide a superior docking station, for a portable computer, that can be designed to incorporate selected functions required by a user.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

To achieve the above purposes, according to a first aspect of the present invention, a docking station adapted to a portable computer, comprises: (a) a first docking unit, which can be mechanically coupled with the portable computer, including a first connector for electrically connecting with the portable computer, more than one connection port provided for the respective port signal lines that run from the first connector, and a second connector for directly passing through bus signal lines that run from the first connector; (b) a second docking unit, which can be mechanically coupled with the first docking unit, including a third connector for electrically connecting with the second connector, space for retaining a peripheral device connected to a bus expanded through the third connector, and at least one bus slot to connect an expansion adaptor card to the bus expanded through the third connector.

According to a second aspect of the present invention, a docking unit adapted to a portable computer, comprises: a mounting portion on which the portable computer is mounted; a first connector for electrically connecting with the portable computer; more than one connection port provided for port signal lines that run from the first connector; and a second connector for directly passing through bus signal lines that run from the first connector.

According to a third aspect of the present invention, a docking unit that can be coupled with and removed from the docking unit according to the second aspect, comprises: a third connector for electrically connecting with the second connector; space for retaining a peripheral device connected to a bus expanded through the third connector; and at least one bus slot for connecting an expansion adaptor card to the bus expanded via the third connector.

Figure 1:
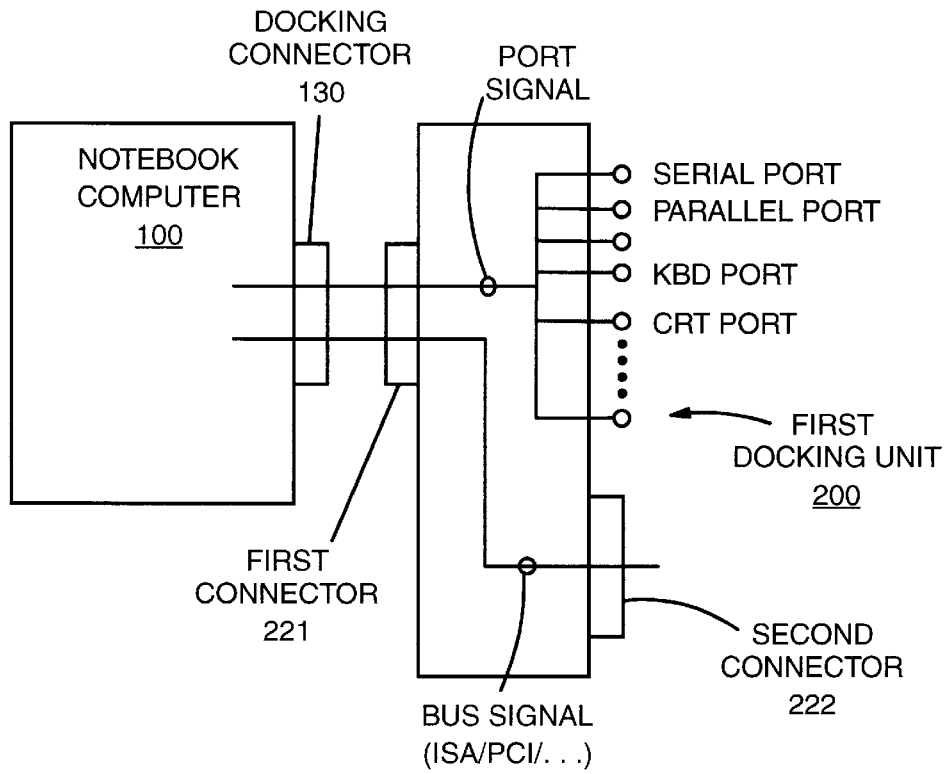
FIG. 1 is a conceptual diagram illustrating a docking unit, for a personal computer according to the present invention, and a personal computer that can be docked with this unit, or more specifically, is a high-level block diagram illustrating a notebook computer 100 and a first docking unit 200.
Figure 2:
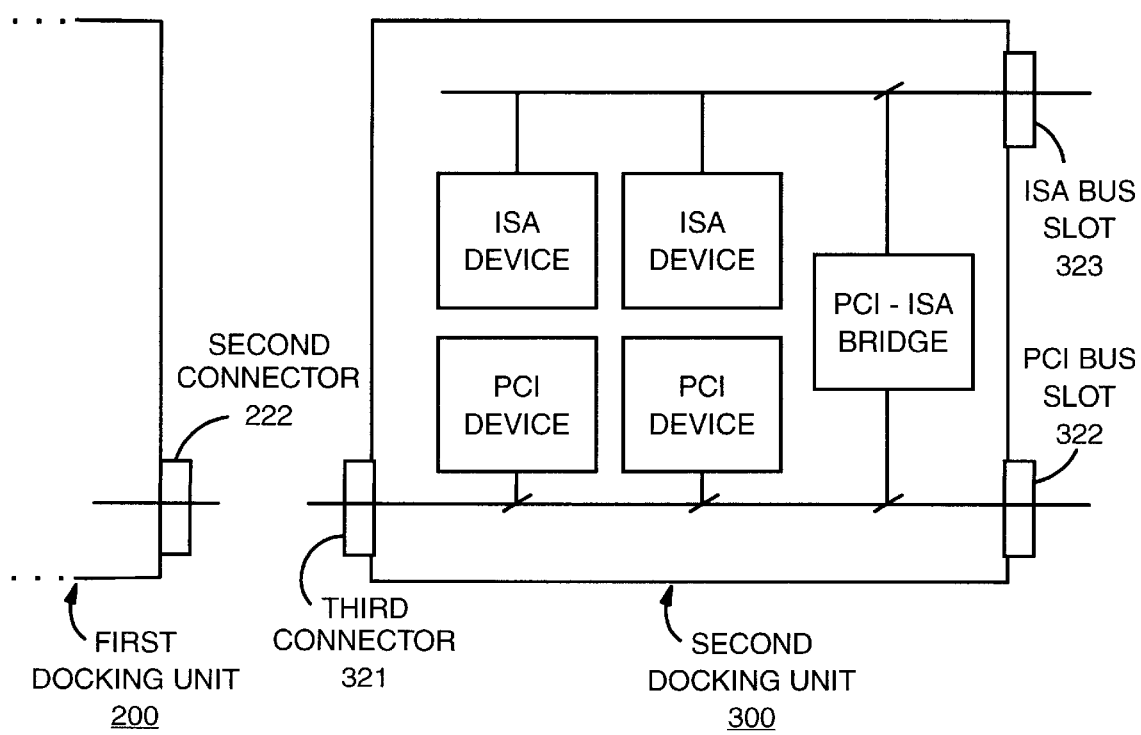
FIG. 2 is a high-level block diagram illustrating one mode of a second docking unit 300, or more specifically, a block diagram illustrating a PCI bus expansion type docking unit.
Figure 3:
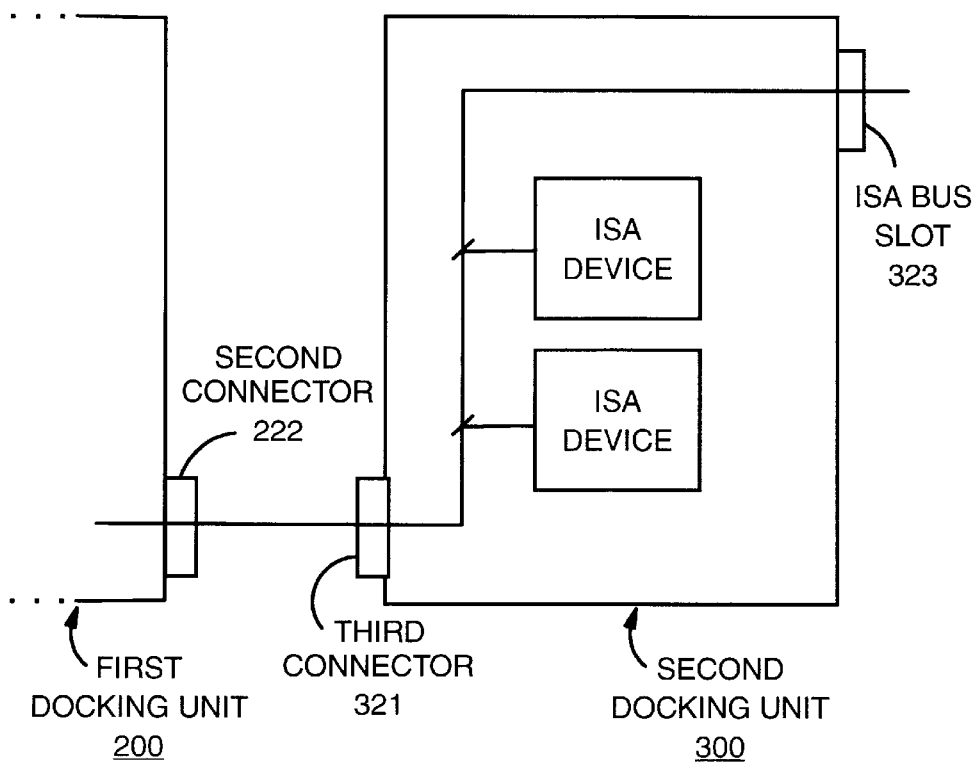
FIG. 3 is a high-level block diagram illustrating one mode of the second docking unit 300, or more specifically, a block diagram for an ISA bus expansion type docking.

FIGS. 1 through 3 are high-level conceptual diagrams illustrating a notebook computer and a docking station for it according to the present invention.

A docking station according to the first aspect of the present invention comprises a first docking unit 200 and a second docking unit 300. The first docking unit 200 corresponds to a docking unit according to the second aspect of the present invention, and the second docking unit 300 corresponds to a docking unit according to the third aspect of the present invention.

A notebook computer 100 incorporates a printed circuit board (not shown) that mounts a CPU, a main memory, and various other electrical circuits. Various port signal lines and bus signal lines extended from the printed circuit board are collected and appear externally as a docking connector 130. The port signal lines here are, for example, a serial signal line, a parallel signal line, and a video signal line. The kinds of port signal lines extended to the exterior are relatively common to all notebook computer types. On the other hand, depending on the computer model, bus signal lines allocated for the docking connector 130 vary. That is, the expanded bus may be, for example, an ISA bus, or a local bus such as a PCI bus. The types and the number of peripheral devices desired to be connected to the expanded the bus, i.e., the configuration of the docking station, vary in accordance with user needs, and a common configuration that will suffice for all types of notebook computers is difficult to define.

The first docking unit 200 has a mechanism by which it can be coupled with and separated from the notebook computer 100. The docking unit 200 has a first connector 221 that physically engages the docking connector 130 of the notebook computer 100 and has matched electrical specifications. The first connector 221 collectively receives port signal lines and bus signal lines from the notebook computer 100 through the docking connector 130. The signal lines in the first connector 221 are again divided into the port signal lines and bus signal lines inside the docking unit 200. The port signal lines are electrically connected to the corresponding ports that are provided on the surface of the case of the docking unit 200. The ports are, for example, a serial port, a parallel port, and a CRT port. The divided out bus signal lines pass directly through to a second connector 222. The second docking unit 300 has only one function, from among the functions required for a docking station, that is relatively common to users. Thus, the second docking unit 300 can be defined as the minimum required docking station. From another point of view, the first docking unit 200 absorbs the form factor of the notebook computer 100 and the differences in the mechanical and the electrical specifications between the docking connectors so as not to affect the second docking unit 300. The ports and the second connector 222 are arranged on the surface opposite the first connector 221.

The second docking unit 300 supplements those functions, from among the functions required of a docking station, for which the requirements are not very common among users (or among notebook computers). The product lineups for the second docking unit 300 vary, and the configuration differs greatly depending on, for example, which bus in the notebook computer 100 is to be expanded.

FIG. 2 is a schematic diagram illustrating one mode of the second docking unit 300, i.e., the hardware arrangement of a PCI bus expansion type docking unit. The second docking unit 300 has a third connector 321 that physically engages the second connector 222 of the first docking unit 200 and has matched electrical specifications. The second docking unit 300 internally includes a bay for accommodating various peripheral devices, a PCI bus received through the third connector 321, and an ISA bus connected to the PCI bus by a bridge circuit. In the bay at least one PCI device connected to the PCI bus can be accommodated, or at least one ISA device connected to the ISA bus. The end of the PCI bus is electrically connected to a PCI bus slot 322 that is provided on the surface of the case of the second docking unit 300. The end of the ISA bus is electrically connected to an ISA bus slot 323 provided on the surface of the case of the second docking unit 300.

FIG. 3 is a schematic diagram illustrating another example of the second docking unit 300, i.e., the hardware arrangement of an ISA bus expansion type docking unit. The second docking unit 300 has a third connector 321 that physically engages a second connector 222 of a first docking unit 200, and has matched electrical specifications. The second docking unit 300 internally includes a bay for storing various peripheral devices and an ISA bus received through the third connector 321. At least one ISA device connected to the ISA bus is accommodated in the bay. The end of the ISA bus is electrically connected to an ISA bus slot 323 provided on the surface of the case of the second docking unit 300.

As was previously described, the requirements for the bus expansion function of a docking station are not common to all users as compared to the requirements for the port replication function. The connector for coupling the docking unit with the notebook computer and its peripheral portion depend greatly on the product standards, such as the form factor of the notebook computer, and can not cope with many applications. According to the present invention, individually provided are a unit for the port replication function for directly connecting with a notebook computer and a unit for the bus expansion function for which the requirements vary. Thus, when a user desires to alter or expand the expanded contents, he or she has only to change the second docking unit while retaining the port replication function unit, i.e., the first docking unit. When the notebook computer is replaced with a new one, only the first docking unit need be changed while the second docking unit can be retained.

So long as the mechanical and electrical specifications for the docking connector and the first, the second and the third connectors match with each other, the first docking unit can be coupled with many types of second docking unit. Thus, a manufacturer need develop and produce only M+N types of docking units, where M denotes the number of configuration types, such as the contents and the number of devices that can be expanded, and N denotes the number of connector types for notebook computers. In other words, the load that is incurred by the preparation of various product types and the need to carry inventory can be drastically reduced.

Figure 4:
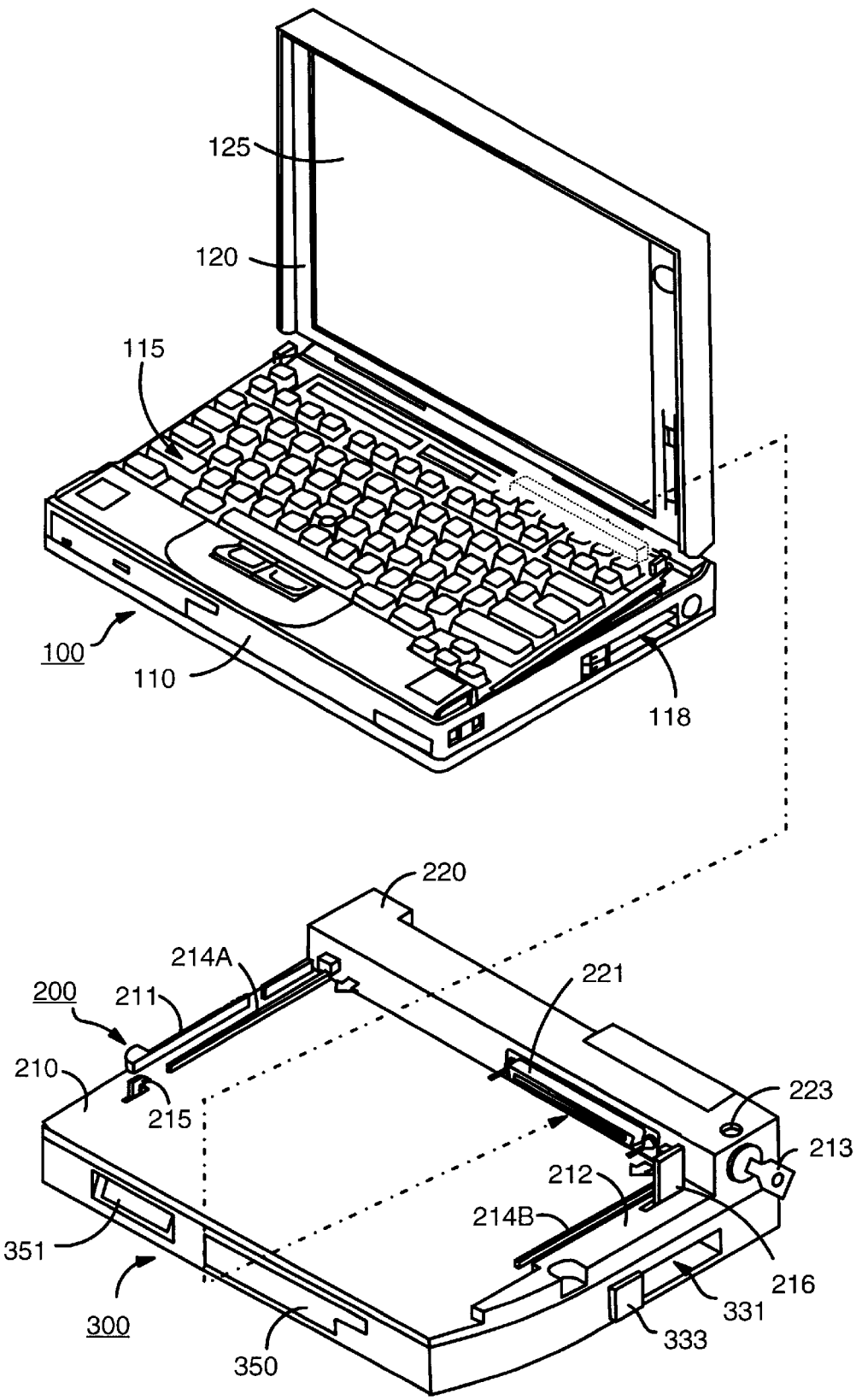
FIG. 4 is a perspective view of the exterior of a docking station for a portable computer according to one embodiment of the present invention.

FIG. 4 is a diagram illustrating the external appearance of a docking station according to one embodiment of the present invention. The docking station comprises two independent units that can be physically coupled with and separated from each other: a first docking unit 200 and a second docking unit 300. The first docking unit 200 corresponds to the "first docking unit" according to the first aspect of the present invention, or to the "docking unit for a portable computer" according to the second aspect of the present invention. The second docking unit 300 corresponds to the "second docking unit" according to the first aspect of the present invention, or to the "docking unit for a portable computer" according to the third aspect of the present invention.

A notebook computer 100 is a personal computer that comprises a shallow-bottom main body 110 and a lid 120 pivotally attached almost at the rear edge of the main body 110. The footprint of the notebook computer 100 is, for example, the size of A4 paper. Generally, a keyboard unit 115 is mounted on the top surface of the main body 110, and a liquid crystal display (LCD) 125 is fitted inside the inner face of the lid 120.

In the notebook computer 100 according to the present invention, a docking connector 130 (not shown) is specially provided on its rear face. Also, formed in the bottom face are a pair of linear grooves (not shown) into which a pair of linear protrusions (which will be described later) are to be inserted and guided along, and an opening (not shown) for engaging a hook 215 (which will be described later) on the first docking unit 200. Further, a card slot 118 is formed in the left side of the notebook computer 100, so that a PC card can be removably inserted and exchanged.

One example of such a notebook computer 100 is the "IBM ThinkPad 760" ("ThinkPad" is a trademark of IBM Corp.) sold by IBM Japan, Ltd. It should be noted that the structure of the notebook computer is not the subject of the present invention.

The first docking unit 200 comprises a mounting portion 210 on which, as a portable computer, the notebook computer 100 is mounted, and a projection portion 220 projected rearward of the mounting portion 210.

The mounting portion 210 is a thin and rigid structure that has a width and a depth corresponding to the footprint of the notebook computer 100. A side wall 211 is defined at the left end of the mounting portion 210, while a security link cover 212 is provided on the right end. The security link cover 212 is a member that covers and hides a transmission mechanism (not shown) that transmits the rotations of a security key 213 to the individual sections. The transmission mechanism is employed to set the docking units 200 and 300 to a predetermined security mode. The rotation of the security key 213 is transmitted to, for example, the hook 215 provided near the front of the mounting portion 210; a first shutter 216 provided upright on the top of the security link cover 212; and a second shutter 333 provided perpendicularly on the right side of the second docking unit 300 (which will be described later).

The distance between the side wall 211 and the internal wall of the link cover 212 is substantially equivalent to the width of the notebook computer 100. A pair of linear protrusions 214a and 214b protrude upward along the right and the left side of the top face of the mounting portion 210, maintaining a predetermined interval towards the back of the unit. When the notebook computer 100 is to be mounted on the first docking unit 200 as indicated by the chained line in FIG. 4, the direction of movement of the notebook computer 100 is restricted by the side wall 211 and the inner wall of the link cover 212, and the notebook computer 100 is guided along the linear protrusions 214a and 214b and can be smoothly attached.

A first connector 221 is provided on the right front surface of the projection portion 220 provided at the rear of the docking unit 300, and employed for connection to the notebook computer 100. The electrical and mechanical specifications of the first connector 221 match those of the docking connector 130 of the notebook computer 100. The first connector 221 consists of, for example, 240 pins, and includes various port signal pins and bus signal pins.

Electrical circuits (not shown) are mounted inside the projection portion 220. The electrical circuits mainly separate the signal pins of the first connector 221 into the port signal pins and the bus signal pins. The signal pins are separated in this manner because the first docking unit 200 performs the port replication function, and the bus expansion function is performed by the second docking unit 300.

Figure 5:
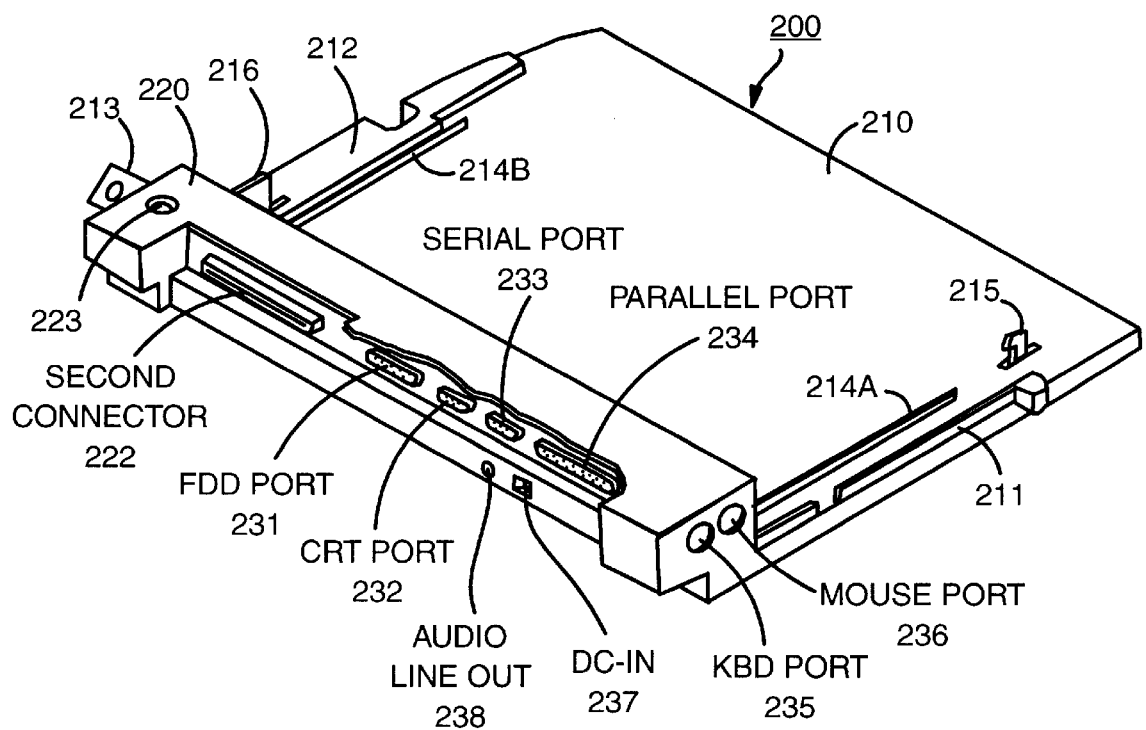
FIG. 5 is an upper left rear perspective view of the first docking unit 200 when it is separated from the second docking unit 300.

FIG. 5 is a perspective view taken from the left rear of the first docking unit 200 when it is separated from the second docking unit 300. It should be noted that in the drawing, one section of the rear edge of the top face of the projection portion 220 is cut away in order to expose the ports, which will be described later.

The bus signal lines obtained by separation inside the projection portion 220 are passed through to corresponding pins of the second connector 222 provided in the rear face. The port signal lines obtained by separation are electrically connected to the corresponding ports provided on the rear face and the side face. The first docking unit 200 in this embodiment has an FDD port 231, a CRT port 232, a serial port 233, a parallel port 234, a keyboard port 235, and a mouse port 236. An external FDD, an external CRT, a modem, a printer, an external keyboard and a mouse (none of which are shown) can be attached to the respective ports 231, 232, 233, 234, 235 and 236. These external devices can be continuously attached to the docking unit 200, regardless of whether the docking unit 200 is coupled with or separated from the notebook computer 100. A DC inlet 237 for receiving DC power, and an audio line out 238 for outputting an audio signal are also provided.

Figure 6:
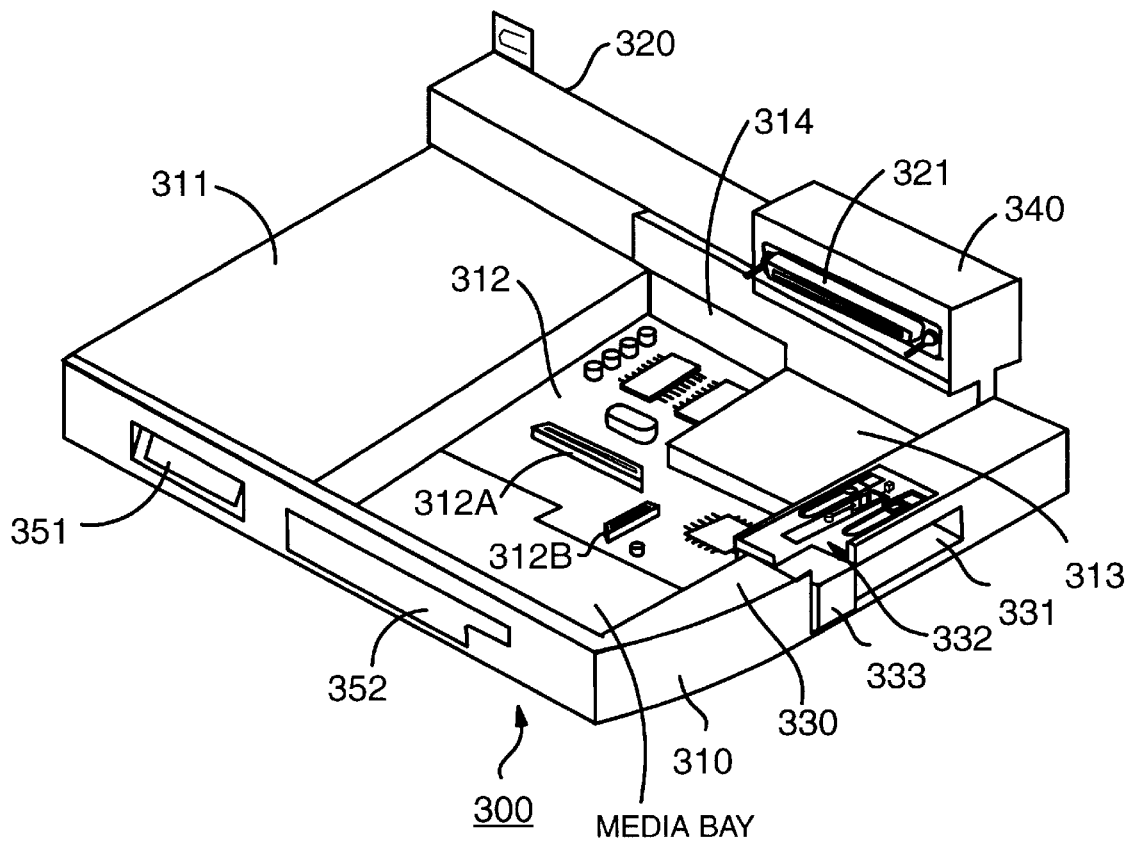
FIG. 6 is a front perspective view of the second docking unit 300 when it is separated from the first docking unit 200.

FIG. 6 is a front perspective view of the second docking unit 300 when it is separated from the first docking unit 200. To avoid making the drawing overly complex, various cables and mounted circuits are not illustrated in detail.

The case of the second docking unit 300 comprises a bottom cover 310 wherein various electrical circuits and memory media are accommodated, and a rear cover 320 for covering the rear surface.

The bottom cover 310 is a shallow-bottom, relatively firm structure. An LCD panel 351 for displaying the status of the second docking unit 300 and a bezel 352 that shields the opening for exchanging storage media (mainly, a CD-ROM and a floppy disk) are provided in the front face of the bottom cover 310.

The left half of the bottom cover 310 is occupied by a power supply circuit 311 that can supply power to the second docking unit 300 itself, the first docking unit 200 and the notebook computer 100. Further, a printed circuit board 312 is secured with screws at the lowermost layer of the right half of the bottom cover 310.

The room around the front right half of the bottom cover 310 is defined as a "media bay" in which either a CD-ROM drive, an FDD or an HDD can be stored. A connector 312a, to which a CD-ROM or an FDD can be connected, and an IDE (Integrated Device Electronics) connector 312b, to which an HDD can be connected, are mounted at the front of the printed circuit board 312.

A PC card slot 313 is formed at the rear of the media bay. Two relatively thin type I/I cards or one relatively thick type III card, for example, can be inserted into the PC card slot 313.

A riser card 314 is provided upright near the rear end of the printed circuit board 312. At the rear of the bottom cover 310, a projection portion 340, in which the riser card 314 is inserted, is integrally formed with the bottom cover 310. A third connector 321 is attached to the front face of the riser card 314, while various bus slots, such as a PCI slot 322 and an ISA slot 323, a SCSI port 324 and a MIDI port 325, are mounted in the rear face of the riser card 314 (none of which are shown in FIG. 6). The third connector 321 is used to receive bus signals passed through from the first docking unit 200. The electrical and mechanical specifications of the third connector 321 match those of the second connector 222. The bus slots 322 and 323, the SCSI port 324, the MIDI port 325, and the audio line out jack 326 are exposed on the rear face of the second docking unit 300, and a PCI expansion adaptor card, an ISA expansion adaptor card, a SCSI bus and a MIDI device can be connected respectively.

An extension portion 330 is formed on the right side of the bottom cover 310 and is extended outward from the footprint that is originally a rectangle. A card slot 331, for receiving a PC card, is formed in the surface of the extension portion 330. Interlocking means 332 that receives the rotation of a security key 213 from the first docking unit 200. A second shutter 333, that can slide forward and backward in response to the transmission means 332, are arranged on the top of the extension portion 330.

Figure 7:
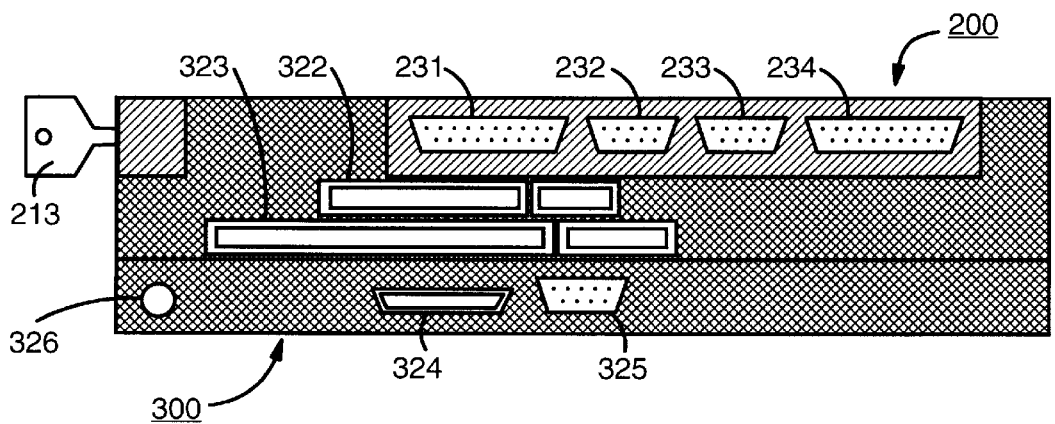
FIG. 7 is a rear view of the first docking unit 200 and the second docking unit 300 when they are coupled together.

FIG. 7 is a rear view of the first docking unit 200 and the second docking unit 300 when they are coupled together.

The rear surface of the second docking unit 300 is covered by the rear cover 320. Openings are formed in the rear cover 320 to expose the bus slots 322 and 323, the SCSI port 324 and the MIDI port 325 on the outside.

A notch is formed substantially in the central portion of the projection portion 340. Accordingly, when the first docking unit 200 is coupled with the second docking unit 300, the ports 231 through 236 do not mechanically interfere with the case of the second docking unit 300. Thus, any external devices connected to the ports can remain attached and do not have to be removed each time the docking units are coupled with or separated from each other. When the docking units are coupled together, a port for connecting an audio device and inlet for connecting an AC adapter become unnecessary because the second docking unit 300 provides them. The DC inlet 237 and the audio line out 238 are therefore shielded by the second docking unit 300.

The docking units 200 and 300 shown in FIGS. 4 and 7 have a security mechanism for protecting a computer system from theft. The security mechanism comprises a security key 213; a transmission mechanism accommodated in a security link cover 212; a hook 215 driven by the rotation of the security key 213; a first shutter 216; and a second shutter 333. As the security mechanism is not the subject of the preset invention, only operations for the individual sections that are visible externally will be briefly explained in this portion.

Figure 8:
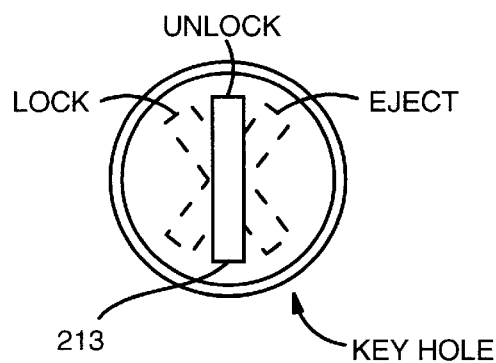
FIG. 8 is a diagram showing key positions for a security key 213.

For the security key 213 provided to the rear on the left side of the first docking unit 200, as is shown in FIG. 8, there are three key positions: from the right, "eject position", "unlock position" and "lock position". The individual key positions correspond to the operating conditions for the devices 100, 200, and 300. More specifically, the eject position is a key position at which the mounted notebook computer 100 is ejected; the unlock position is a key position at which the notebook computer 100 is not locked in place and can be removed from the docking units, even though it can be mounted; and the lock position is a key position where the removal of the mounted notebook computer 100 and loaded PC cards are inhibited. The rotation of the security key 213 is transmitted to the individual sections of the docking units 200 and 300 by the transmission mechanism (not shown) in the link cover 212, so that these sections perform predetermined operations. An indicator 223 is located in the top right end of the projection portion 220 to indicate key position.

Figure 9:
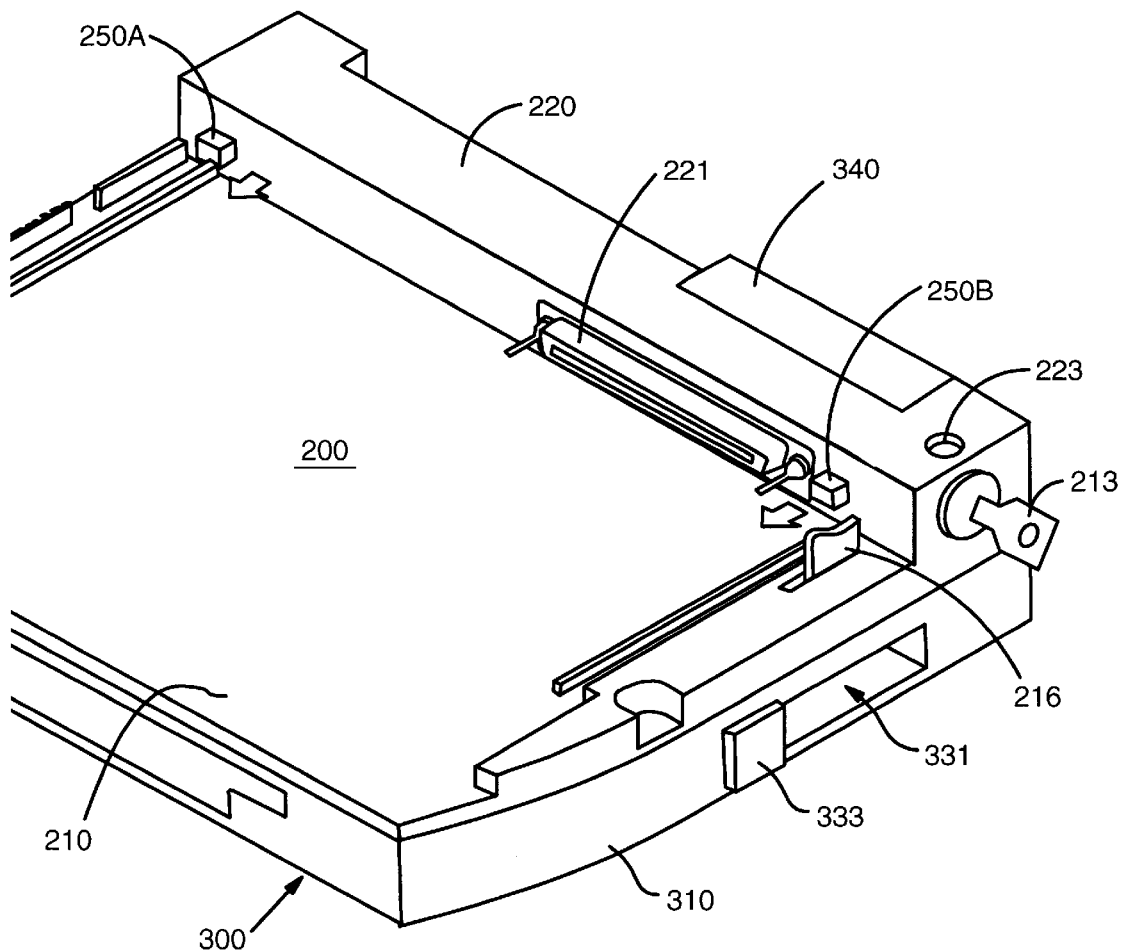
FIG. 9 is a diagram showing the state where the security key 213 is placed at the eject position.

In FIG. 9 is shown the status where the security key 213 is turned to the eject position.

As the security key 213 is rotated clockwise from the unlock position, a pair of ejectors 250a and 250b interact and project outward from the right and left front of the projection portion 220. The ejectors 250a and 250b abut upon the mounted notebook computer 100 (not shown in FIG. 9) and push it forward.

A recovery force for returning from the eject position to the unlock position constantly acts on the security key 213. This function is provided based on the reasoning that the eject operation should only be performed temporarily, and that the security key 213 must normally be at the unlock position where a notebook computer 100 can be mounted. In addition, as the key operation is required for conditions other than the locked condition, removal of the security key 213 from the key hole is prevented while it is at the eject position and at the unlock position. Since the security key 213 is always inserted except where the computer is locked, a plurality of users can share a single docking unit (multi-user environment).

The state where the security key 213 is turned so that it is almost vertical is the unlock position. The unlocked state is a neutral state between the eject position and the lock position, and while the notebook computer 100 and the PC cards can be freely mounted in this state, nothing prevents them from being removed.

When the security key 213 is further rotated counterclockwise from the unlock position to the lock position, the docking units 200 and 300 are locked together.

Figure 10:
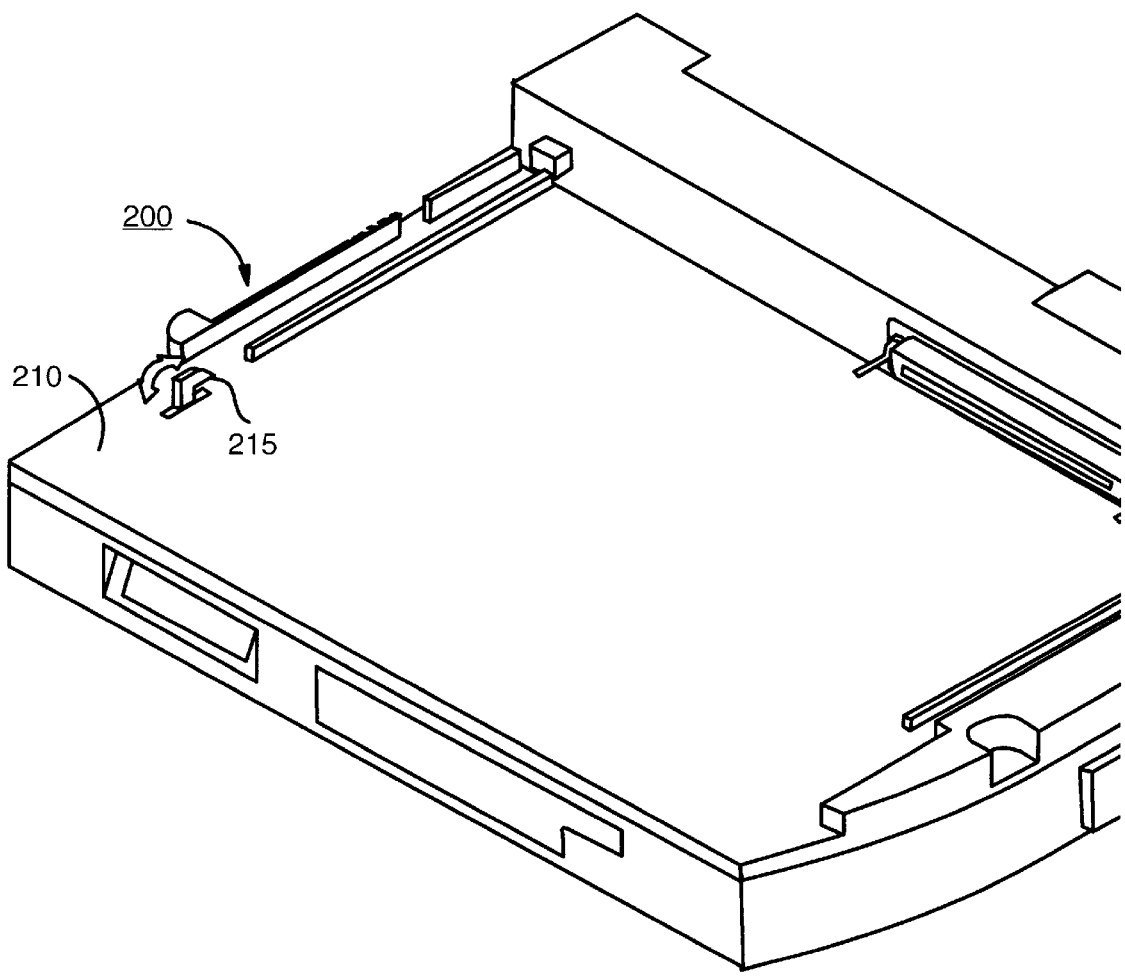
FIG. 10 is a diagram showing the condition where a hook 215 on the top of a mounting portion 210 is manipulated.
Figure 11:
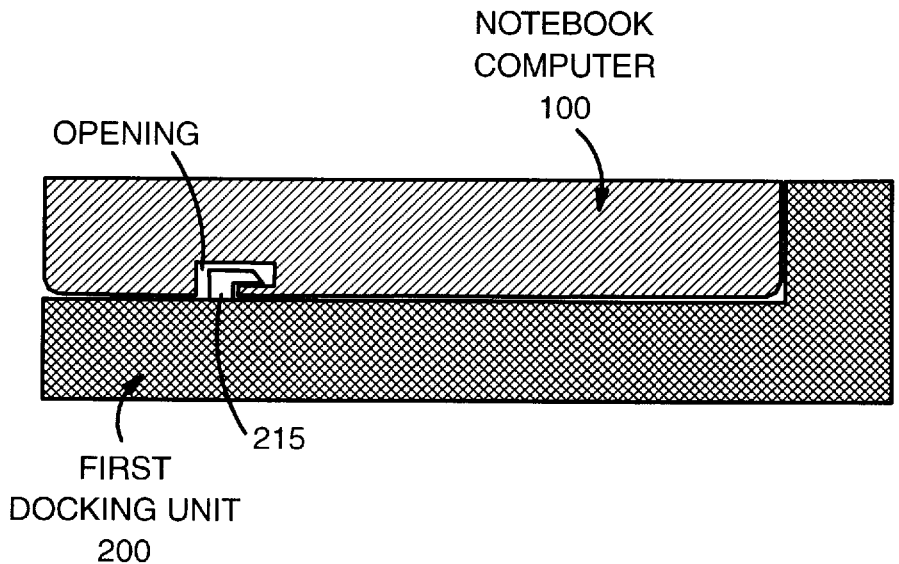
FIG. 11 is a diagram showing the state where the hook 215 engages the notebook computer 100.

One action that accompanies the shift to the lock position involves the employment of a hook 215 to inhibit the removal of the notebook computer 100. In the unlocked condition, the hook 215 is freely extracted from the notebook computer 100 and is retracted into the mounting portion 210 (see FIG. 10). However, when the security key 213 is turned to the lock position, the hook 215 appears to interlock with the notebook computer, and the retraction of the hook 215 into the mounting portion 210 is inhibited. As a result, as is shown in FIG. 11, the hook 215 continues to engage the opening formed in the corresponding opening portion of the bottom of the notebook computer 100, and the removal of the notebook computer 100 is inhibited.

Figure 12:
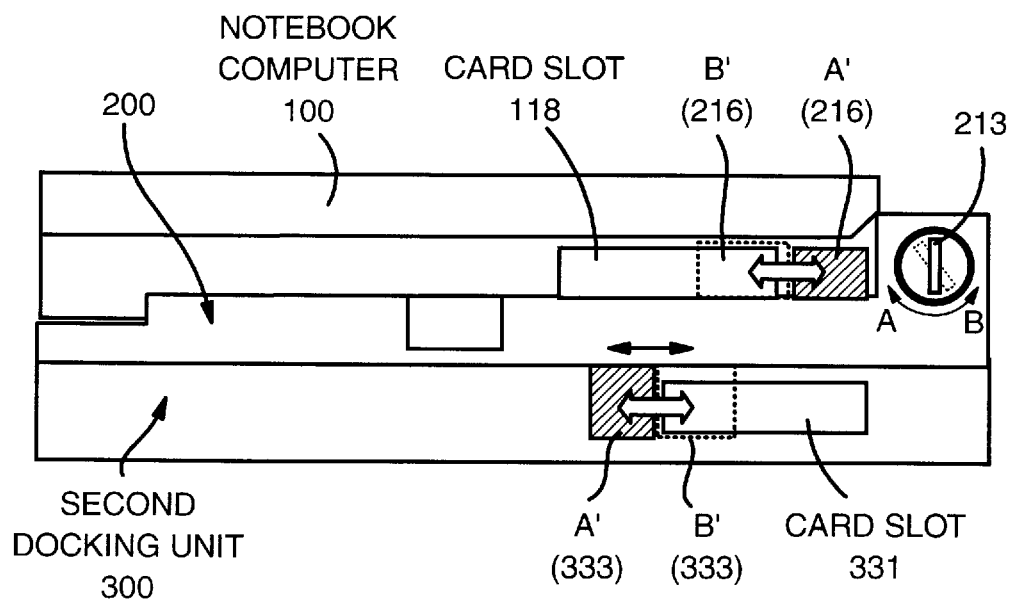
FIG. 12 is a diagram showing the condition where a first shutter 216 inhibits the removal of a PC card from the notebook computer 100, and where a second shutter 333 inhibits the removal of a PC card from the second docking unit 300.

Another action that accompanies the shift to the lock position is the inhibition of the removal of PC card(s) from the PC card slot of the notebook computer 100. As was previously described, the card slot 118 is on the left side and substantially at the rear of the notebook computer 100. The first shutter 216 is located upright on the top of the link cover 212 of the first docking unit 200. As is shown in FIG. 12, the first shutter 216 interacts with the rotation of the security key 213 and slides forward and backward. At the unlock position (A), the first shutter 216 is positioned at the rear (A') and the card slot 118 of the notebook computer 100 is fully opened. At the lock position (B), however, the first shutter 216 slides forward and shields at least one part of the card slot 118 (B'). As a result, the removal of the PC card is desirably inhibited.

An additional action that accompanies the shift to the lock position is the inhibition of the removal of PC card(s) from the PC card slot of the second docking unit 300. As has been previously described, the second docking unit 300 has the card slot 331 near the rear of the left side. The second shutter 333 is vertically formed near the center of the left side of the second docking unit 300. As is shown in FIG. 12, the second shutter 333 interacts with the rotation of the security key 213, and slides forward and backward. At the unlock position (A), the second shutter 333 is positioned almost in the center (A') and the card slot 331 of the second docking unit 300 is fully opened. At the lock position (B), however, the second shutter 333 slides backward and shields at least one part of the card slot 331 (B'). As a result, the removal of a PC card is desirably inhibited.

A further action that accompanies the shift to the lock position is the inhibition of the separation of the first docking unit 200 and the second docking unit 300. Since the separation of the units is inhibited, peripheral devices (e.g., an HDD, a CD-ROM, or an FDD retained in a media bay) in the docking unit 300 can be protected from being removed accidentally.

Unlike at the other key positions, the removal of the security key 213 is permitted at the lock position. This prevents an unauthorized user from operating the key, and provides physical security.

Figure 13:
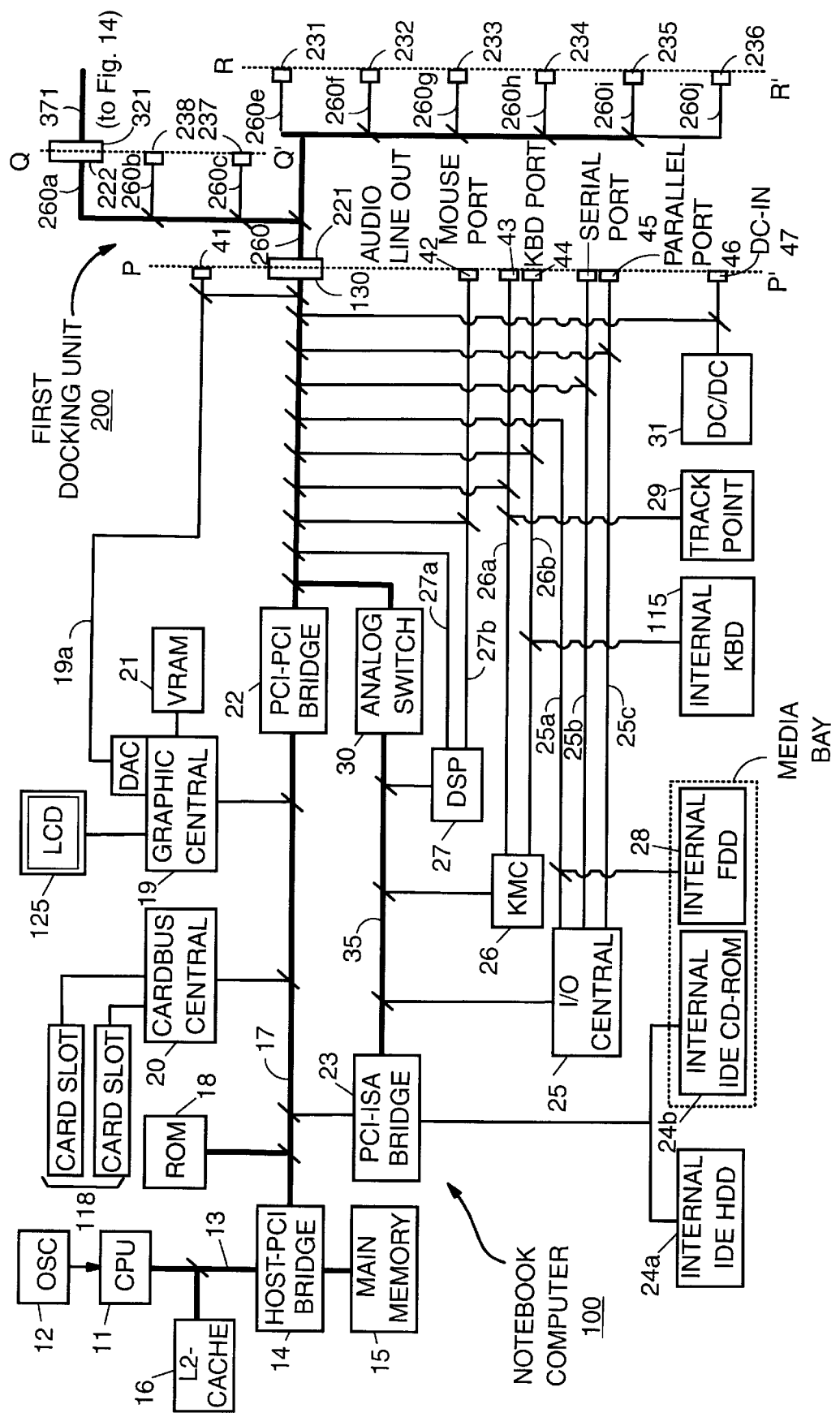
FIG. 13 is a specific diagram illustrating the internal hardware arrangements of the notebook computer 100 and the first docking unit 200.
Figure 14:
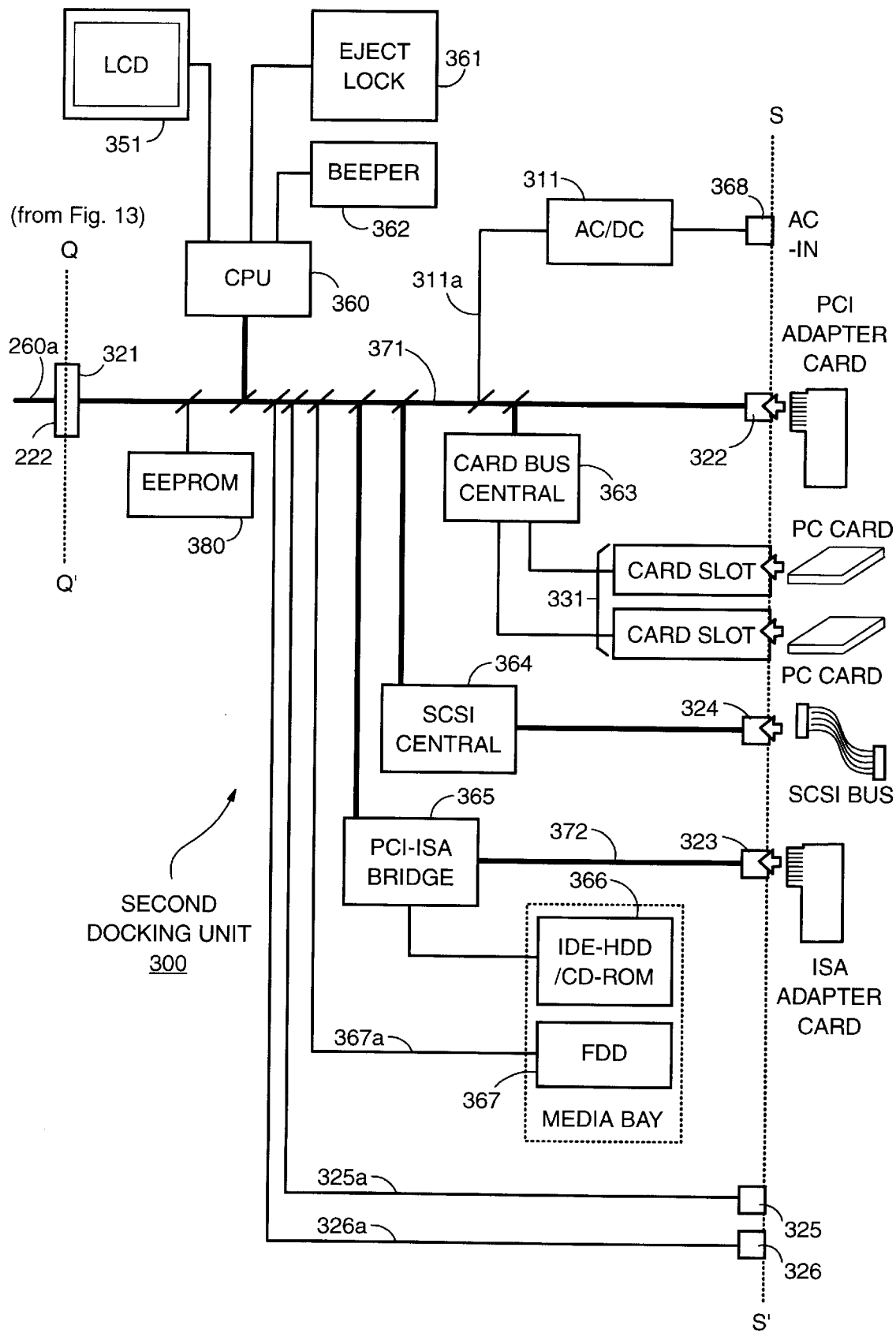
FIG. 14 is a specific diagram illustrating the internal hardware arrangement of the second docking unit 300 according to one embodiment.
Figure 15:
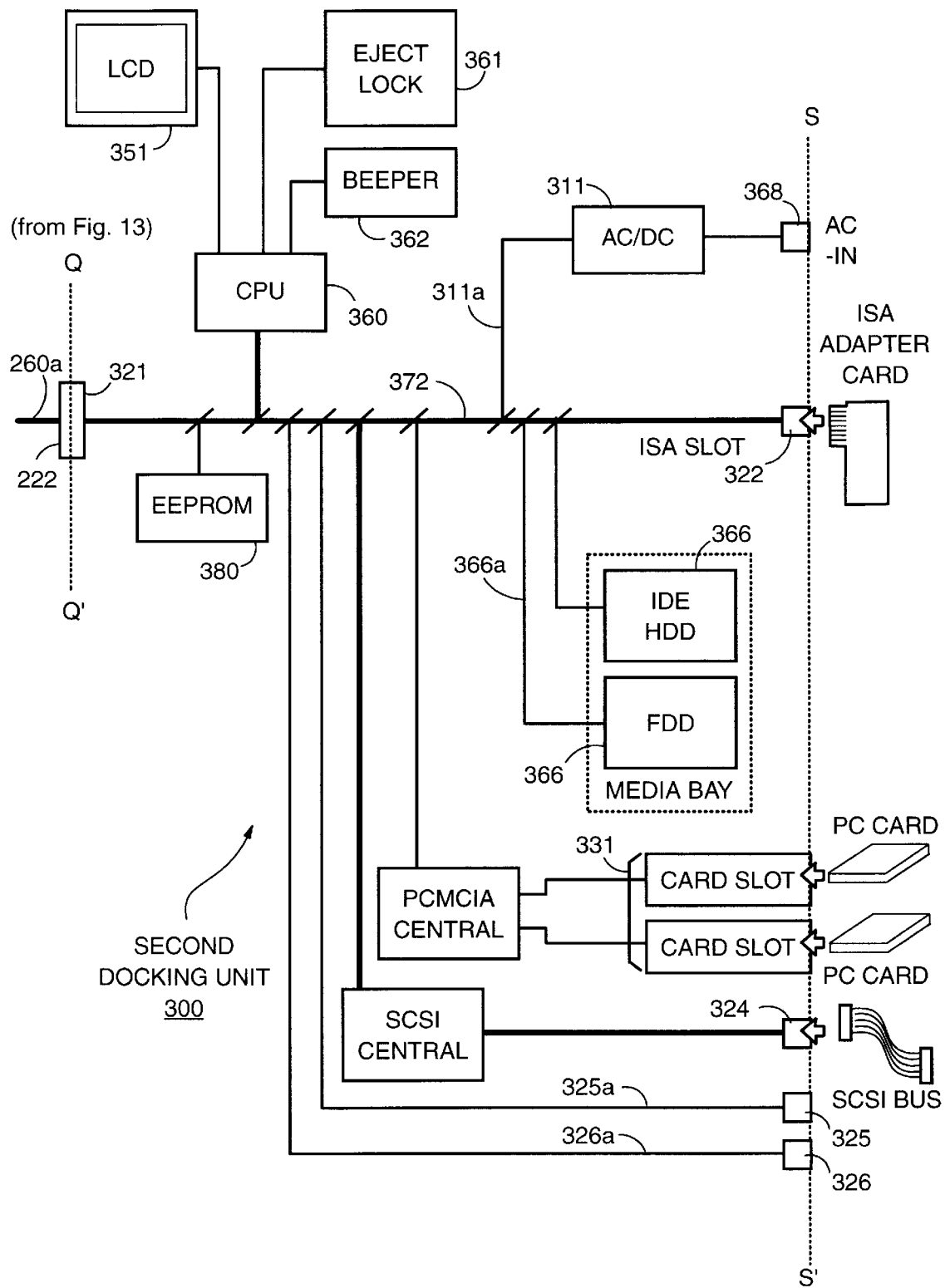
FIG. 15 is a specific diagram illustrating the internal hardware arrangement of the second docking unit 300 according to another embodiment.
Figure 16:
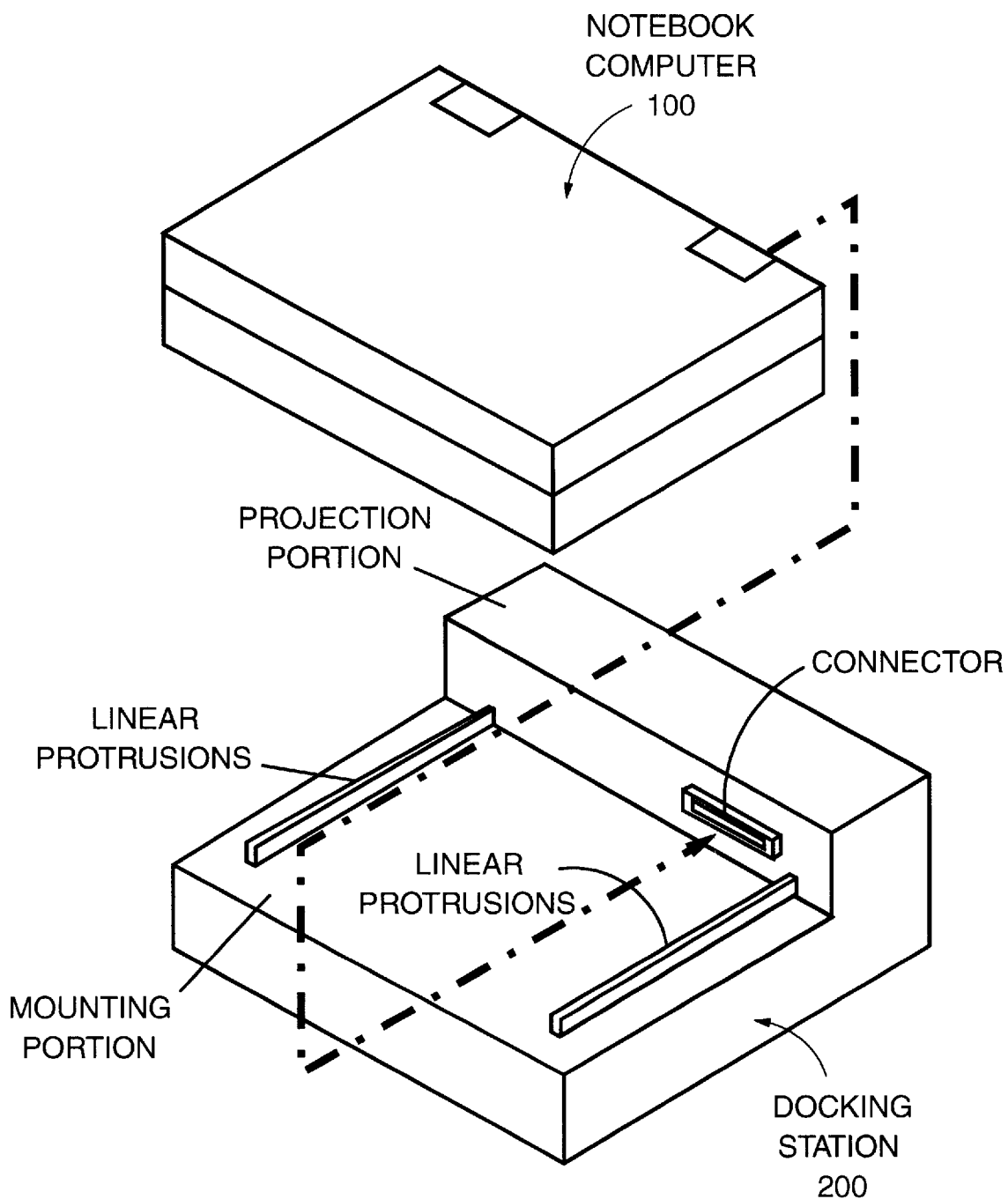
FIG. 16 is a diagram illustrating a typical mode of a docking station.

FIG. 13 is a specific diagram illustrating the internal hardware arrangements of the notebook computer 100 and the first docking unit 200 employed to carry out the present invention. FIGS. 14 and 15 are specific diagrams of the internal hardware arrangement of the second docking unit 300. The individual sections will now be described.

A CPU 11, which is a main controller, executes various programs under the control of an operating system (OS). An operating clock is supplied by an oscillator (OSC) 12. The CPU 11 is, for example, a "Pentium/1xx MHZ" by Intel Corp. The CPU 11 is connected with the individual devices across three-layer buses: a processor bus 13 directly connected to the external pins of the CPU 11; a PCI (Peripheral Component Interconnect) bus 17 as a local bus; and an ISA (Industry Standard Architecture) bus 35 as an input/output bus.

The processor bus 13 and the PCI bus 17 communicate with each other across a bridge circuit (host-PCI bridge) 14. The design of the bridge circuit 14 in this embodiment provides for the inclusion of a memory controller for controlling access to a main memory 15, and a data buffer for absorbing differences in data transfer rates between the buses 13 and 17. The main memory 15, which is a volatile memory such as a DRAM, is employed as a loading area for programs and as a work area for a program being executed. An L2-cache 16 is composed of a memory device, such as an SRAM, that can be accessed at high speed, and is employed to save the minimum required data in order to absorb differences between the processing speed of the CPU 11 and the accessing speed to the main memory 15. A ROM 18 is a nonvolatile memory in which are stored control code for hardware operation (BIOS) and a test program executed at the time of power on (POST).

The PCI bus 17 is a high speed bus originally proposed by Intel Corp. Its primary performance specifications are a bus width of 32 bits, an operating frequency of 33 MHZ, and a highest transfer speed of 132 Mbps. Another feature of the PCI is that it can be mutually connected to another independently driven bus by a bridge circuit (for example, blocks 22, 23 or 365). The PCI bus 17 communicates with devices, such as a graphic controller 19 and a CardBus controller 20, for which relatively fast data transfer is required.

The graphic controller 19 is a peripheral controller that actually processes a drawing command from the CPU 11. The graphic controller 19 temporarily writes the processed image data in a screen buffer (VRAM) 21, and thereafter reads the image data from the VRAM 21 and outputs it to a liquid crystal display (LCD) 125 that is provided as standard feature. The graphic controller 19 can employ an attached DA converter to convert a video signal into an analog signal. An analog video signal is output to a CRT port 41 across a signal line 19a. The signal line 19a is branched on route and also forwards signals to the docking connector 130.

The CardBus controller 20 transmits bus signals across the PCI bus 17 to the PC card slot 118. A PC card that conforms to "PC Card Specification 95" and that can be driven at high speed is inserted into the card slot 118.

A bridge circuit (PCI-PCI bridge) 22 is provided at the rear end of the PCI bus 17. The bridge circuit 22 is employed for data exchange between the PCI bus 17 and a local (secondary) PCI bus 371 (i.e., the bus of the second docking unit 300). The bridge circuit 22 disables the signal pins of the local side when there is no PCI bus provided for the local side.

The PCI bus 17 and the ISA bus 35 are mutually connected by a bridge circuit (PCI-ISA bridge) 23. The bridge circuit 23 in this embodiment includes a DMA controller, a programmable interrupt controller (PIC), and a programmable interval timer (PIT). The bridge circuit 23 also includes an IDE interface for connecting a hard disk drive (HDD) (originally, IDE was the standard employed for connecting an HDD directly to an ISA bus). An incorporated IDE_HDD 24a and an internal IDE_CD-ROM 24b, which are installed as standard features, are connected to the IDE interface. The two bridge circuits, 14 and 23, conform to the PCI, and generally are available as a single-chip set. A chip set example is "Triton" by Intel Corp.

The ISA bus 35 communicates with devices for which relatively low speed data transfer is satisfactory: an I/O controller 25, a keyboard/mouse controller (KMC) 26, and a digital signal processor (DSP) 27.

The I/O controller 25 accesses a floppy disk drive (FDD) 28 and controls serial and parallel data input/output with an external device, for example, a modem or a printer (neither of them shown). An FDD signal line 25a is directed to an internal FDD 28, and is also branched and extended to the docking connector 130. A serial signal line 25b is directed to a serial port 45 on the rear surface of the case of the notebook computer 100, and is also branched and extended to the docking connector 130. A parallel signal line 25c is directed to a parallel port 46, and is also branched and extended to the docking connector 130. It should be noted that since the volume of the notebook computer 100 is limited, only one of the FDD 28 and the IDE_CD-ROM 24b can be accommodated in the media bay at one time.

The KMC 26 controls data input/output at a keyboard or with a mouse or a Track Point ("Track Point" is a trademark of IBM Corp.). A mouse signal line 26a and a keyboard signal line 26b are directed respectively to a mouse port 43 and a keyboard port 44, and are also branched and extended to the docking connector 130.

The DSP 27 is a dedicated processor for handling digital signals and is employed primarily for audio data processing. The DSP 27 can also process MIDI (Musical Instrument Digital Interface) data. A MIDI signal line 27a is assigned to one part of the docking connector 130. An audio output signal line 27b is directed to an audio line out 42, and is also branched and extended to the docking connector 130.

An analog switch 30 is used to connect the rear end of the ISA bus 35 to the docking connector 130 and to separate it therefrom. In other words, the analog switch 30 switches the rear end of the ISA bus 35 on to electrically connect the bus 35 to a corresponding pin of the docking connector 130, or switches the ISA bus 35 off to electrically separate the bus 35 from the docking connector 130. The analog switch 30 is controlled by the bridge circuit 22. When the PCI bus 17 is directly connected with the peripheral side via the docking connector 130 (see FIG. 14; which will be described later), the bridge circuit 22 drives the local bus pin and the analog switch 30 switches the ISA bus 35 off. When the ISA bus is directly connected to the peripheral side via the docking connector 130 (FIG. 15; which will be described later), the bridge circuit 22 switches the local bus pin off, and the analog switch 30 switches it on. In other words, only one of the PCI bus 17 and the ISA bus 35 is assigned to the docking connector 130 at a time.

A DC-DC converter 31 reduces a DC voltage supplied via the DC inlet 47 or the docking connector 130, and stably supplies power to the individual devices in the notebook computer 100.

As is illustrated in FIG. 13, the PCI bus 17, the ISA bus 35, the branched port signal lines 25a, 25b, 25c, 26a, 26b, . . . , and power feed lines 31a are all collected together into one bundle. The connector pins in the docking connector 130 are assigned to these collected signal lines and power feed lines. The mechanical and electrical specifications for the docking connector 130 match those of the first connector 221 of the first docking unit 200.

Line segment P–P' corresponds to the rear surface of the case of the notebook computer 100. The docking connector 130 and the other ports 41 through 47, which are not collected at the connector 130, are mostly arranged in an area that corresponds to line segment P–P'. While the notebook computer 100 is not coupled with the first docking unit 200, the rear portion P–P' is exposed outward and the ports 41 through 47 can be connected with corresponding external devices, for example, an external CRT display, an external keyboard, etc., which are not shown. On the other hand, while the notebook computer 100 is docked to the first docking unit 200, the rear portion P–P' is closely attached to the front face of the projection portion 220 so that the docking connector 130 is attached to the first connector 221 both mechanically and electrically. Although the other ports 41 through 47 are shielded and can not be used due to this docking, they are replicated by the first docking unit 200.

The hardware structure of the notebook computer 100 is not an essential factor for the present invention. Also, two-layer buses comprising a PCI bus and an ISA bus are not necessarily provided. Further, the function that alternately connects either the PCI bus or the ISA bus to the docking connector 130 is not required, and only one bus need be fixedly connected to the docking connector 130. The minimum requirement for the notebook computer 100 to contribute to the present invention is that it provide the docking connector 130 matching the electrical and mechanical specifications of the first connector 221.

The mechanical and electrical specifications for the first connector 221 of the first docking unit 200 match those of the docking connector 130.

In the first docking unit 200, a signal line bundle 260 that has been received collectively through the first connector 221 is branched to bus signal lines (PCI bus or ISA bus) 260a, an audio output signal line 260b, a power feed line 260c, an FDD signal line 260e, a CRT signal line 260f, a serial signal line 260g, a parallel signal line 260h, a keyboard signal line 260i, and a mouse signal line 260j. These branched bus and port signal lines are directed respectively to the second connector 222, the audio line out 238, the DC inlet 237, the FDD port 231, the CRT port 232, the serial port 233, the parallel port 234, the keyboard port 235, and the mouse port 236.

From among the connectors and ports, the second connector 222, and the DC inlet 237 and the audio line out 238 are arranged along the portion indicated by line segment Q–Q'. The portion corresponding to the line segment Q–Q' is closely attached to the second docking unit 300 when the docking units 200 and 300 are coupled together. The second connector 222 is then mechanically and electrically connected to the third connector 321 of the second docking unit 300. However, the DC inlet 237 and the audio line out jack 238 are shielded by the docking and can not be used. This is because power is supplied from the second docking unit 300 when the docking units 200 and 300 are coupled together, and the audio line out is replicated by the second docking unit 300 and becomes unnecessary.

The FDD port 231, the CRT port 232, the serial port 233, the parallel port 234, the keyboard port 235, and the mouse port 236 are located in the surface of the case indicated by line segment R–R'. The R–R' portion corresponds to an area that does not mechanically contact the second docking unit 300, even when both docking units are coupled together. Therefore, external devices, such as an external FDD, an external CRT display, a modem, a printer, an external keyboard, and an external mouse (none of which are shown), connected to the ports can be continually attached to the docking unit 200, regardless of whether it is coupled with the other unit 300 or is separated therefrom. In other words, the connection of the cables to these ports can be totally managed by the first docking unit 200 alone.

The second docking unit 300 shown in FIG. 14 is a PCI bus expansion type.

The second docking unit 300 has the third connector 321 with the electrical and mechanical specifications matching those of the second connector 222, that collectively receives bus signals and port signals.

A CPU 360 is a processor for controlling the operations of the individual sections in the second docking unit 300 especially when docking with or undocking from the notebook computer 100. The docking and undocking during a normal operational mode or a power management mode (also called "hot docking" or "warm docking") can be performed by the CPU 360 communicating with the CPU 11 in the notebook computer 100. However, "hot docking" and "warm docking" are not related to the subject of the present invention, and will not be explained here.

The CPU 360 drives an eject lock 361 which electrically inhibits the removal of the notebook computer 100, a beeper 362 for generating an alarm sound at the time of docking and undocking, and an LCD panel 351 for indicating the state of the second docking unit 300.

An EEPROM 380 is a nonvolatile memory whose contents can be electrically erased and reprogrammed. The EEPROM 380 is used to store a minimum amount of data, such as the serial product number of the docking unit 300, the password and system configuration data required, for security during docking and undocking and for guaranteeing the operation of a system. The stored contents can be read by the CPU 360 and by the CPU 11 of the notebook computer 100.

An AC/DC adaptor 311 rectifies and smooths an alternating current voltage supplied from an external AC power source (e.g., a commercially available power source) to produce a predetermined direct current driving voltage. The AC/DC adaptor 311 receives power from an outside power source through an AC inlet 368. A power feed line 311a is collected into a bus 371, which is directed to the third connector 321.

A MIDI port 325 is a port for fetching MIDI data from an external MIDI device. A MIDI signal line 325a is connected to the bus 371 and is directed to the third connector 321.

An audio output signal line 326a of the third connector 322 is branched from the bus 371 and is directed to an audio line out jack 326.

An FDD signal line 367a of the third connector 322 is branched from the bus 371 and is directed to the connector 312a (see FIG. 6). An FDD 367 can be connected through the connector 312a.

The PCI bus 371 extended into the second docking unit 300 communicates with those devices for which relatively high speed data transfer is required: a CardBus controller 363 and a SCSI (Small Computer System Interface) controller 364. The PCI bus slot 322 is formed at the rear end of the PCI bus 371. A PCI expansion adaptor card can be inserted into the PCI bus slot 322.

The CardBus controller 363, as well as the hardware block 20, transmit bus signals across the PCI bus 371 to the PC card slot 331.

The SCSI controller 364 performs protocol conversion between the PCI bus 371 and a SCSI bus 364a, which is located outside, via the SCSI port 324. A maximum of eight SCSI devices can be connected to the SCSI port 324 by using a daisy chain. SCSI devices are, for example, HDD's, CD-ROM drives, MO disk drives, etc.

The second docking unit 300 further includes an ISA bus 372. An ISA bus slot 323 is provided at the rear end of the ISA bus 372 for attaching an ISA expansion adaptor card. The purpose of expanding the ISA bus is to allow the utilization of the wealth of ISA devices and software. The PCI bus 371 and the ISA bus 372 are mutually connected by a bridge circuit (PCI-ISA bridge) 365.

The structure of the bridge circuit 365 is almost the same as the hardware block 23, and also has an IDE interface. An HDD, a CD-ROM, or other IDE device can be attached to the IDE interface. For the second docking unit 300 in this embodiment, however, because of the limitation placed on its volume, only one of the FDD 367 and the IDE device (an HDD or CD-ROM drive) 366 can be accommodated in the media bay at a time.

The bus slots 322, 323, the card slot 331, the ports 324 and 325, and the AC inlet 368 are formed in the surface (line segment S–S' in FIG. 14) of the case of the second docking unit 300.

FIG. 15 is a specific diagram illustrating the internal hardware arrangement of another second docking unit 300'. The second docking unit 300' is so designed that only an ISA bus 372 is expanded, instead of a PCI bus.

Not only does the docking unit 300' have no PCI bus, it also does not have either a bridge circuit (PCI-ISA bridge) or a PCI bus slot. Further, instead of a CardBus controller, a PCMCIA (Personal Computer Memory Card International Association) controller 369 is employed to output signals across the ISA bus 372 to a card slot. The other hardware blocks are almost the same as those in FIG. 14.

It should be fully understood that so long as the electrical and mechanical specifications of the third connector 321 match those of the second connector 222, either of the second docking units shown in FIG. 14 or in FIG. 15 can be used together with the first docking unit 200.

Although many electrical circuits other than those shown in FIGS. 13 through 15 are necessary to constitute the apparatuses 100, 200 and 300, they are well known to one having ordinary skill in the art and are not related to the subject of the present invention, and so an explanation thereof is not given in this specification.

In the drawings and specifications there has been set forth a preferred embodiment of the invention and, although specific terms are used, the description thus given uses terminology in a generic and descriptive sense only and not for purposes of limitation.

What is claimed is:

1. A portable computer docking station complex for connection to and use with a portable computer, comprising:

a first docking unit mechanically coupleable with the portable computer having a first connector for electrically connecting with the mechanically coupleable portable computer, and defining a plurality of port signal lines and a plurality of bus signal lines, a plurality of connection ports for respective ones of the plurality of port signal lines, and a second connector electrically connected with the first connector for passing through the first docking unit the plurality of bus signal lines; and a second docking unit mechanically coupleable in a vertical direction with the first docking unit having a projection portion integrally formed as a part of the second docking unit and extending in the vertical direction to form a portable computer docking station complex of two docking units, and wherein the projection portion houses a third connector electrically connected and mateably engaged with the second connector, and wherein the second docking unit includes space for retaining a peripheral device connectable to a bus expanded through the third connector, and at least one bus slot for connecting an expansion adaptor card to the bus expanded through the third connector.

2. The docking station complex for connection to and use with a portable computer according to claim 1, wherein the plurality of connection ports comprise at least one of an FDD port, a CRT port, a serial port, a parallel port, a keyboard port and a mouse port.

3. The docking station complex for connection to and use with a portable computer according to claim 1, wherein the plurality of bus signal lines includes PCI bus signal lines.

4. The docking station complex for connection to and use with a portable computer according to claim 1, wherein the plurality of bus signal lines includes an ISA bus signal line.

5. A portable computer docking complex for connection to a portable computer to form a vertical stack including the portable computer docking complex and the portable computer, comprising:

a mounting unit on which the portable computer is vertically mountable having a first connector for electrically connecting with the portable computer, a plurality of port signal lines and a plurality of bus signal lines, a plurality of connection ports provided for the port signal lines and a second connector for directly passing through the bus signal lines to a third connector housed in a vertically disposed projection portion of a portable computer expansion unit including structure for retaining a peripheral device connected to a bus expanded through the third connector, and having at least one bus slot for connecting an expansion adaptor card to the bus expanded through the third connector.

6. The portable computer docking complex for connection to a portable computer to form a vertical stack including the portable computer docking complex and the portable computer according to claim 5, wherein the plurality of connection ports includes at least one of an FDD port, a CRT port, a serial port, a parallel port, a keyboard port and a mouse port.

7. The portable computer docking complex for connection to a portable computer to form a vertical stack including the portable computer docking complex and the portable computer according to claim 5, wherein the plurality of bus signal lines includes a PCI bus signal line.

8. The portable computer docking complex for connection to a portable computer to form a vertical stack including the portable computer docking complex and the portable computer according to claim 5, wherein the plurality of bus signal lines includes an ISA bus signal line.

9. A portable computer docking station complex including at least two docking units vertically stacked for connection to and use with a vertically stacked portable computer, comprising:

a first docking unit mechanically coupleable with the portable computer having a first connector for electrically connecting and mechanically coupling with the portable computer in a horizontal direction, and defining a plurality of port signal lines and a plurality of bus signal lines, a plurality of connection ports for respective ones of the plurality of port signal lines, and a second connector electrically connected with the first connector for passing through the first docking unit the plurality of bus signal lines; and a second docking unit having a third connector housed in a vertically extending projection portion on the second docking unit electrically connected with the second connector of the first docking unit and mechanically coupled with the first docking unit in a horizontal direction to vertically stack the second docking unit with the first docking unit, structure in the second docking unit for retaining a peripheral device connectable to a bus expanded through the third connector, and at least one bus slot for connecting an expansion adaptor card to the bus expanded through the third connector of the second docking unit.

10. The portable computer docking station complex including at least two docking units vertically stacked for connection to and use with a vertically stacked portable computer according to claim 9, wherein the portable computer connects with the first connector of the first docking unit in a first horizontal direction, and the third connector of the second docking unit connects to the second connector of the first docking unit in a second horizontal direction which second horizontal direction is different than the first horizontal direction.

11. The portable computer docking station complex including at least two docking units vertically stacked for connection to and use with a vertically stacked portable computer according to claim 10, wherein the portable computer connects with the first connector of the first docking unit in a first horizontal direction, and the third connector of the second docking unit connects to the second connector of the first docking unit in a second horizontal direction which second horizontal direction is opposite the first horizontal direction.

* * * * *